(12) United States Patent
Nakazawa

(10) Patent No.: US 9,894,236 B2
(45) Date of Patent: Feb. 13, 2018

(54) PHOTOELECTRIC TRANSDUCER, IMAGE READING DEVICE, IMAGE FORMING APPARATUS, AND IMAGE READING METHOD

(71) Applicant: Masamoto Nakazawa, Kanagawa (JP)

(72) Inventor: Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/361,265

(22) Filed: Nov. 25, 2016

(65) Prior Publication Data

US 2017/0163836 A1 Jun. 8, 2017

(30) Foreign Application Priority Data

Dec. 3, 2015 (JP) .................................. 2015-236806

(51) Int. Cl.
| | |
|---|---|
| *H04N 1/04* | (2006.01) |
| *H04N 1/193* | (2006.01) |
| *H04N 1/00* | (2006.01) |
| *H04N 5/374* | (2011.01) |

(52) U.S. Cl.
CPC ......... *H04N 1/193* (2013.01); *H04N 1/00013* (2013.01); *H04N 5/374* (2013.01); *H04N 2201/0081* (2013.01)

(58) Field of Classification Search
CPC ... G06F 21/602; G09C 1/00; G11B 20/00086; G11B 20/0021; H04L 2209/12; H04L 2209/805; H04L 9/0631; H04L 9/0637; H04L 9/12; H04N 2005/91364;

(Continued)

(56) References Cited

U.S. PATENT DOCUMENTS 5,926,579 A * 7/1999 Uejo ...................... H04N 1/403
358/466
5,956,421 A * 9/1999 Tanaka ..................... G06K 9/38
358/2.1

(Continued)

FOREIGN PATENT DOCUMENTS

| JP | 2001-268355 | 9/2001 |
| JP | 2001-339580 | 12/2001 |
| JP | 2007-124144 | 5/2007 |

OTHER PUBLICATIONS

U.S. Appl. No. 15/191,035, filed Jun. 23, 2016.
U.S. Appl. No. 15/176,395, filed Jun. 8, 2016.

*Primary Examiner* — Negussie Worku
(74) *Attorney, Agent, or Firm* — Oblon, McClelland, Maier & Neustadt, L.L.P.

(57) ABSTRACT

A photoelectric transducer includes: a plurality of pixels arranged in one direction for each of colors of light to be received, and configured such that light is converted into an electrical signal in each of the plurality of pixels; a parallel processor configured to perform parallel processing on a plurality of electrical signals obtained through conversion in the pixels in synchronization with a spread-spectrum clock for each of pixel groups, each of the pixel groups including a predetermined number of pixels; and a corrector configured to correct an offset level of each of the plurality of electrical signals having undergone the parallel processing performed by the parallel processor, using one of values, each of the values being common within one of the pixel groups.

14 Claims, 13 Drawing Sheets

(58) Field of Classification Search
CPC .. H04N 21/4223; H04N 21/4408; H04N 5/33; H04N 5/378
USPC ...... 358/1.15, 3.03, 442, 536; 382/144, 145, 382/151, 158, 205, 252, 263, 304
See application file for complete search history.

(56) References Cited

U.S. PATENT DOCUMENTS

| | | | | |
|---|---|---|---|---|
| 6,023,530 | A * | 2/2000 | Wilson | G06T 7/74 382/219 |
| 6,603,878 | B1 * | 8/2003 | Takemoto | G06T 5/004 358/520 |
| 7,420,700 | B2 * | 9/2008 | Hayashi | H04N 1/4052 358/1.15 |
| 7,570,796 | B2 * | 8/2009 | Zafar | G03F 1/84 382/144 |
| 8,675,086 | B1 * | 3/2014 | Linzer | H04N 5/217 348/220.1 |
| 8,692,176 | B2 * | 4/2014 | Kelly | G11B 20/00086 250/208.1 |
| 9,628,654 | B2 * | 4/2017 | Konno | H04N 1/00896 |
| 9,774,807 | B2 * | 9/2017 | Asaba | H04N 5/3694 |
| 2007/0188638 | A1 | 8/2007 | Nakazawa et al. | |
| 2008/0252787 | A1 | 10/2008 | Nakazawa et al. | |
| 2010/0027061 | A1 | 2/2010 | Nakazawa | |
| 2010/0171998 | A1 | 7/2010 | Nakazawa | |
| 2011/0026083 | A1 | 2/2011 | Nakazawa | |
| 2011/0051201 | A1 | 3/2011 | Hashimoto et al. | |
| 2011/0063488 | A1 | 3/2011 | Nakazawa | |
| 2012/0008173 | A1 | 1/2012 | Konno et al. | |
| 2012/0019697 | A1 * | 1/2012 | Suzuki | H04N 5/3575 348/308 |
| 2012/0092732 | A1 | 4/2012 | Nakazawa | |
| 2012/0224205 | A1 | 9/2012 | Nakazawa | |
| 2013/0063792 | A1 | 3/2013 | Nakazawa | |
| 2014/0029065 | A1 | 1/2014 | Nakazawa | |
| 2014/0204427 | A1 * | 7/2014 | Nakazawa | H04N 5/378 358/445 |
| 2014/0204432 | A1 | 7/2014 | Hashimoto et al. | |
| 2014/0211273 | A1 | 7/2014 | Konno et al. | |
| 2014/0368893 | A1 | 12/2014 | Nakazawa et al. | |
| 2015/0098117 | A1 | 4/2015 | Marumoto et al. | |
| 2015/0116794 | A1 | 4/2015 | Nakazawa | |
| 2015/0163378 | A1 | 6/2015 | Konno et al. | |
| 2015/0222790 | A1 | 8/2015 | Asaba et al. | |
| 2015/0304517 | A1 | 10/2015 | Nakazawa et al. | |
| 2016/0003673 | A1 | 1/2016 | Hashimoto et al. | |
| 2016/0006961 | A1 | 1/2016 | Asaba et al. | |
| 2016/0088179 | A1 | 3/2016 | Nakazawa et al. | |
| 2016/0112660 | A1 | 4/2016 | Nakazawa et al. | |
| 2016/0119495 | A1 | 4/2016 | Konno et al. | |
| 2016/0173719 | A1 | 6/2016 | Hashimoto et al. | |
| 2016/0268330 | A1 | 9/2016 | Nakazawa et al. | |
| 2016/0295138 | A1 | 10/2016 | Asaba et al. | |

* cited by examiner

PHOTOELECTRIC TRANSDUCER, IMAGE READING DEVICE, IMAGE FORMING APPARATUS, AND IMAGE READING METHOD

CROSS-REFERENCE TO RELATED APPLICATIONS

The present application claims priority under 35 U.S.C. § 119 to Japanese Patent Application No. 2015-236806, filed Dec. 3, 2015. The contents of which are incorporated herein by reference in their entirety.

BACKGROUND OF THE INVENTION

1. Field of the Invention

The present invention relates generally to photoelectric transducers, image reading devices, image forming apparatuses, and image reading methods.

2. Description of the Related Art

In scanners, CCDs (Charge Coupled Devices) have conventionally been used as photoelectric transducers. However, recent demands for speedup have focused a spotlight on CMOS (Complementary Metal Oxide Semiconductor) linear image sensors (CMOS sensors). CMOS sensors are analogous to CCDs in converting incident light into an electrical signal using a photodiode (PD). However, CMOS sensors differ from CCDs in that CMOS sensors perform charge-voltage conversion and output resultant voltages downstream near every pixel. Furthermore, because CMOS sensors use a CMOS process, a CMOS sensor can incorporate a circuit(s), such as an ADC (Analog-Digital-Converter), therein. Furthermore, CMOS sensors can be more advantageous than CCDs in terms of speed when configured to include ADCs, each of which is provided for one or more pixels, and operate the ADCs in parallel.

Some CMOS sensors may use a modulated clock (SSC (Spectrum-Spread Clock)) in clocking. The SSC is used to reduce an influence of electromagnetic interference (EMI); however, use of the SSC in an analog circuit can disadvantageously cause stripes to appear on an image. The stripes result from that drive timing is modulated by the SSC. Even if the SSC is not used in the analog circuit, when ADC and/or another logic circuit is provided on the same chip as the CMOS sensor, noise resulting from the SSC can reach the analog circuit via the logic circuit and disadvantageously cause similar image stripes to appear.

To counter the above problem, for example, Japanese Unexamined Patent Application Publication No. 2001-268355 (Patent Document 1) discloses an image reading device configured to align phases of a modulation period of a spread-spectrum clock generator circuit with reference to a main-scanning line-sync signal using a modulation phase aligner, thereby making phases of modulated period coincide with each other, so that a main-scanning line has the same periodic noise as the next and following main-scanning lines.

However, the conventional technique requires a memory for averaging and retaining pixel-by-pixel data to perform shading correction, which disadvantageously leads to an increase in circuit size.

SUMMARY OF THE INVENTION

According to one aspect of the present invention, a photoelectric transducer includes a plurality of pixels, a parallel processor, and a corrector. The plurality of pixels are arranged in one direction for each of colors of light to be received, and configured such that light is converted into an electrical signal in each of the plurality of pixels. The parallel processor is configured to perform parallel processing on a plurality of electrical signals obtained through conversion in the pixels in synchronization with a spread-spectrum clock for each of pixel groups. Each of the pixel groups includes a predetermined number of pixels. The corrector is configured to correct an offset level of each of the plurality of electrical signals having undergone the parallel processing performed by the parallel processor, using one of values. Each of the values is common within one of the pixel groups.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1A:
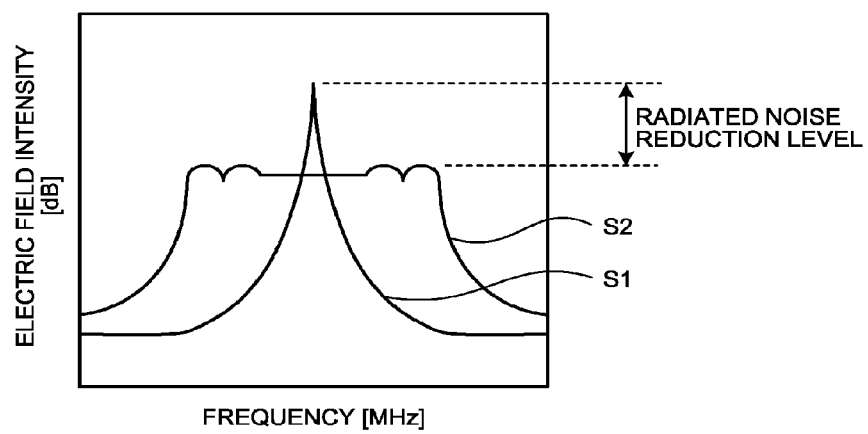
FIG. 1A and FIG. 1B are diagrams illustrating output characteristics of an SSCG.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a photoelectric transducer, an image reading device, an image forming apparatus, and an image reading method capable of reducing generation of stripes on a read image while reducing an increase in circuit size.

Figure 1B:
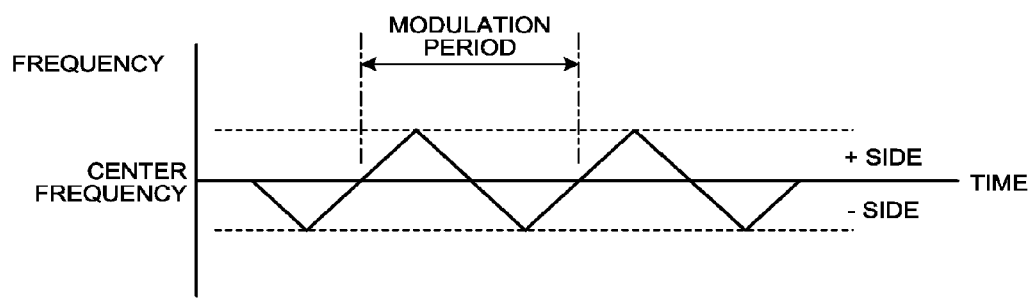

A background of the present invention is described first. As image reading devices become faster, electromagnetic interference (EMI) has arisen as a concern. To alleviate this problem, in recent years, SSCGs (Spectrum Spread Clock Generators) are generally used. FIG. 1A and FIG. 1B are diagrams illustrating output characteristics of an SSCG.

As illustrated in FIG. 1A, an SSCG modulates frequency of an input clock signal to generate a spread spectrum clock (SSC) and thereby reduces a peak level of radiated noise per unit time. In FIG. 1A, un-modulated characteristics are indicated by S1, while modulated characteristics are indicated by S2.

Modulation using an SSCG is generally simple modulation whose profile is triangular. As illustrated in FIG. 1B, frequency of a modulated spread-spectrum clock increases and decreases in a predetermined cycle period. A spread-spectrum range is given as a modulation width (spread amount). The cycle period, in which the frequency increases and decreases, is the modulation period.

Figure 2:
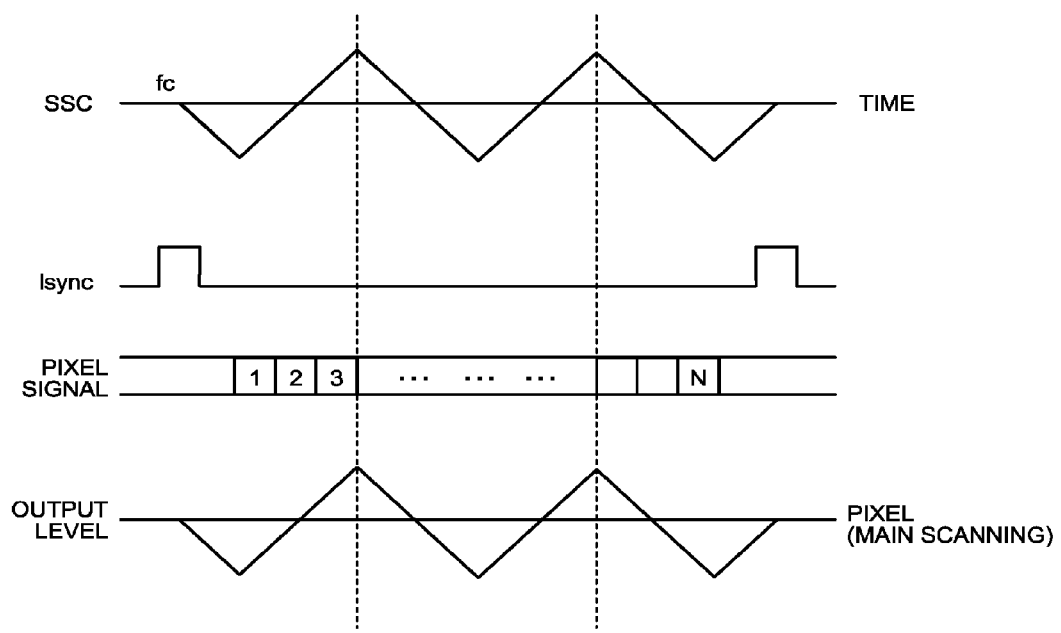
FIG. 2 is a diagram illustrating an output level of an image signal varying with varying frequency of an SSC.

FIG. 2 is a diagram illustrating an output level of an image signal varying with the varying frequency of the SSC. CCDs, which have conventionally been used in scanners, sequentially process values that are read by pixels and output the processed values one pixel by one pixel. Accordingly, in a CCD, an order (processing order) of pixel outputs can be considered as conceptually equivalent to time. That is, as illustrated in FIG. 2, when pixels are processed at different time, the pixels are processed at different clock frequencies. In FIG. 2, fc denotes the center frequency of the SSC.

In this state, because drive timing in the CCD varies from one pixel to another, an output level of an image signal undesirably varies with the varying frequency of the SSC. In FIG. 2, lsync denotes a main-scanning synchronization signal.

Figure 3:
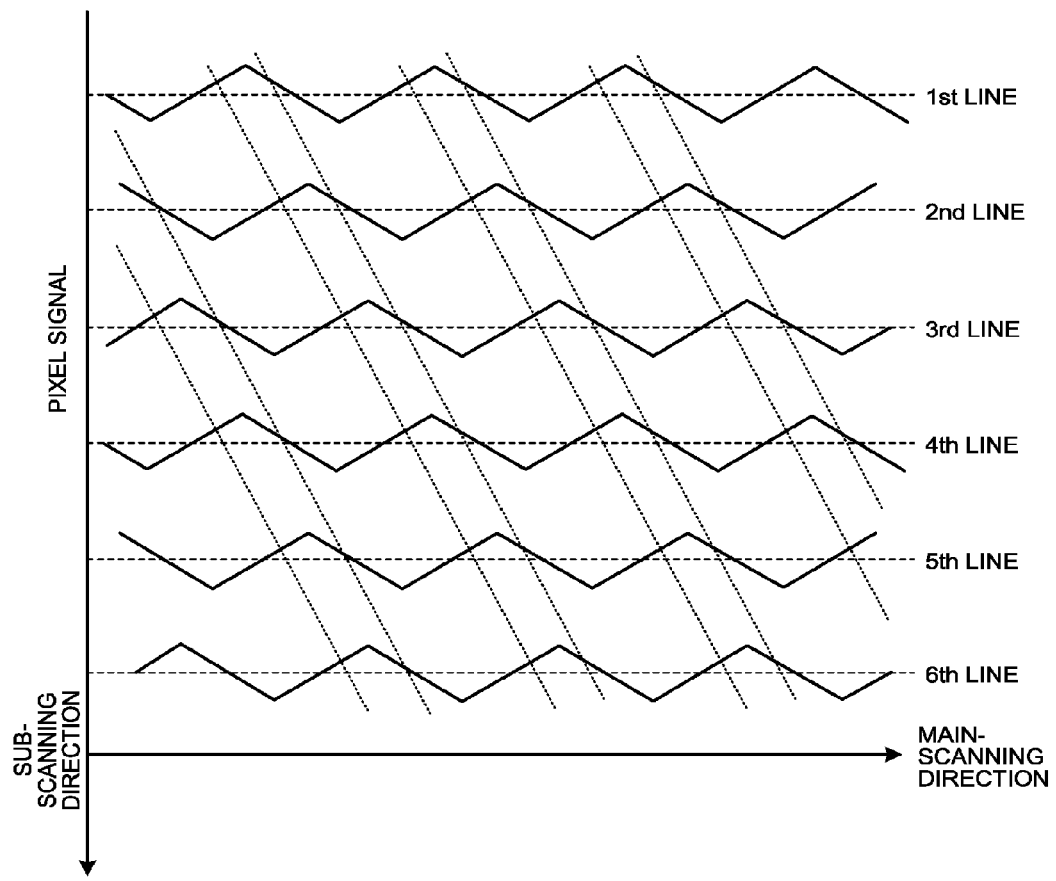
FIG. 3 is a diagram illustrating image stripes appearing on an image read by an image reading device that performs image reading in synchronization with the SSC.

FIG. 3 is a diagram illustrating image stripes appearing on an image (two-dimensional image) read by an image reading device that performs image reading in synchronization with the SSC. As illustrated in FIG. 2, the modulation period of the SSC is generally asynchronous to a main-scanning line period (lsync period). For this reason, as illustrated in FIG. 3, as the number of read lines increases from the first line, the second line, . . . , the phase of oscillation of the image signal is shifted by a larger degree, causing the phase to return to the initial phase after a predetermined number of lines are read. At this time, a peak position of oscillation of the signal level is gradually shifted obliquely, for example, with respect to a scanning direction. As a result, oblique stripes (image stripes) undesirably appear on a read image.

Figure 4:
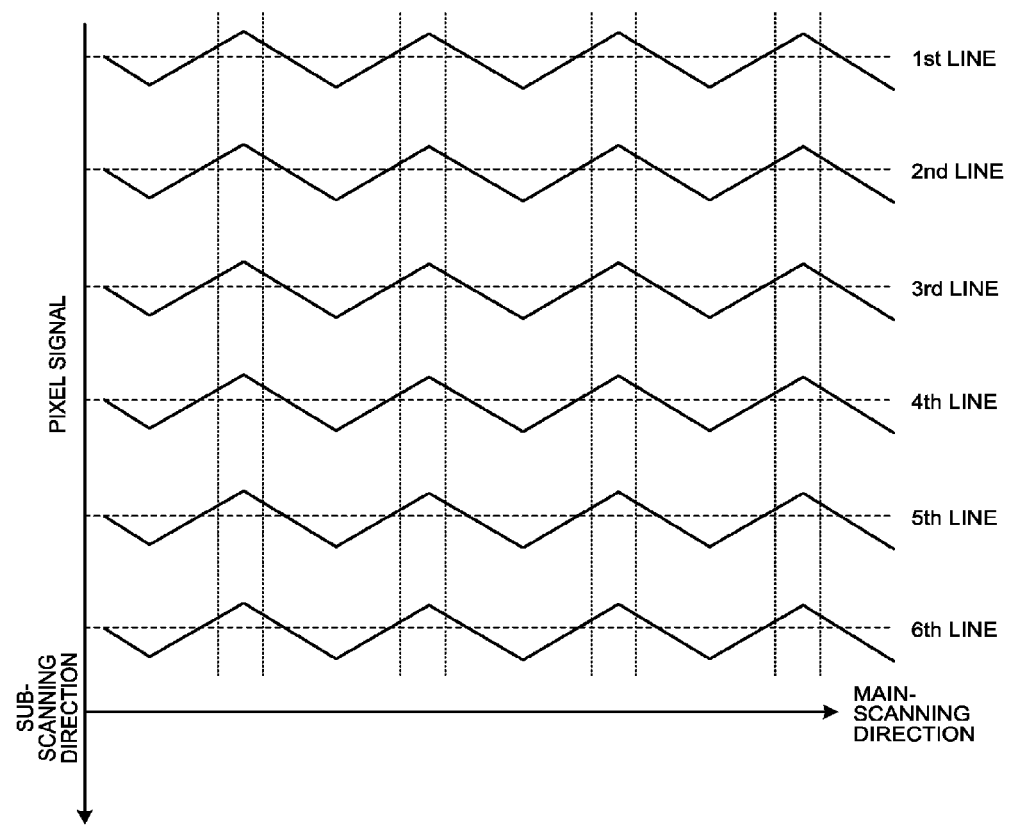
FIG. 4 is a diagram illustrating a read image where image stripes are suppressed using a conventional technique.

FIG. 4 is a diagram illustrating a read image where image stripes are suppressed using a conventional technique. Conventionally, phase of a modulation period is aligned with reference to a main-scanning line, thereby causing a main-scanning line to have the same periodic noise as the next and following main-scanning lines, and arranging a shading correction circuit downstream to calculate a difference with respect to reference data to eliminate noise. However, the conventional technique requires a memory for averaging and retaining pixel-by-pixel data to perform the shading correction on a per-pixel basis, which disadvantageously leads to an increase in circuit size.

Embodiment

Figure 5:
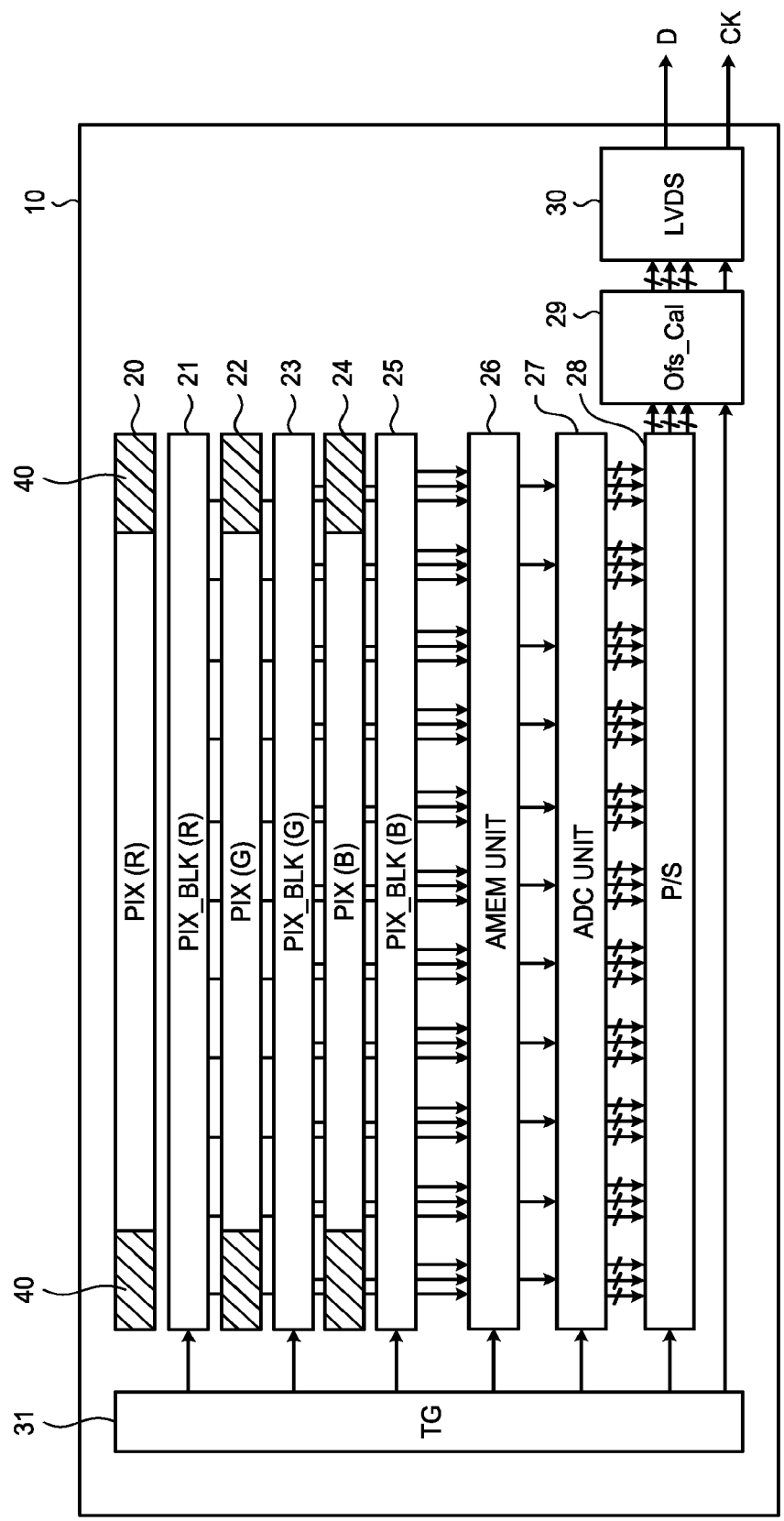
FIG. 5 is a block diagram illustrating components of a CMOS linear image sensor according to an embodiment.

FIG. 5 is a block diagram illustrating components of a CMOS linear image sensor (photoelectric transducer) 10 according to an embodiment. Each of a PIX(R) 20, a PIX(G) 22, and a PIX(B) 24 includes approximately 7,000 PDs (photodiodes) (light-receiving elements) and is configured for a corresponding one of colors R, G, and B (Red, Green, and Blue). The PDs, which are included in pixels, are arranged in parallel rows, each row corresponding to one of colors of to-be-received light. Each of the PDs creates a charge that depends on an amount of received light. Each of the PIX(R) 20, the PIX(G) 22, and the PIX(B) 24 includes light-shielding pixel areas 40 on both ends. The light-shielding pixel area 40 includes a plurality of light-shielded pixels (OPBs (OPtical Black)). The light-shielded pixel includes, as do the other pixels, a PD but differs from the other pixels in being light-shielded.

In this example, each of the PIX(R) 20, the PIX(G) 22, and the PIX(B) 24 is one pixel group to be processed simultaneously. Put another way, the pixel groups are formed on a per-color basis of the to-be-received light. Furthermore, each of the pixel groups includes a plurality of the light-shielded pixels arrayed in the same direction as the pixel group. The photoelectric transducer 10 may be configured to include a plurality of pixel groups for each of the colors of the to-be-received light. For example, each of the PIX(R) 20, the PIX(G) 22, and the PIX(B) 24 may include two pixel groups, each including a predetermined number of pixels.

Each of a PIX_BLK(R) 21, a PIX_BLK(G) 23, and a PIX_BLK(B) 25 includes approximately 7,000 pixel circuits (PIXBLKs) and is configured for a corresponding one of the colors (RGB). Specifically, the pixel circuit (PIXBLK) is provided to each of the PDs.

Each of the pixel circuits (PIXBLKs) converts a charge accumulated by the PD into a voltage signal and outputs the voltage signal to an analog memory (AMEM) via a readout line. The pixel circuit (PIXBLK) includes a transfer transistor that transfers the charge from the PD to a floating diffusion (FD), a reset transistor that resets the FD, and a source follower transistor that buffers an FD voltage and outputs the FD voltage to the readout line. In contrast to an area sensor, a linear sensor reads out signals independently from the R, G, and B pixels, and therefore includes readout lines independently on a per-pixel basis.

An AMEM unit 26 includes, for example, approximately 7,000 analog memories (illustrated in FIG. 8 as "Cs") for each of the colors (RGB), retains signals pixel by pixel, and sequentially outputs the image signals on a per-column basis. The AMEM unit 26 thus retains the signals, thereby implementing a global shutter method of aligning operation timing or, put another way, exposure timing, of the pixel groups (PIXes) and the pixel circuits (PIXBLKs) among R, G, and B.

An ADC unit 27 includes as many AD converters as there are columns and sequentially performs A/D conversion on image signals column by column. The ADC unit 27 thus includes as many AD converters as there are columns and performs parallel processing, thereby achieving speedup of the photoelectric transducer while avoiding an increase in operation speed of the AD converters.

The signals having undergone the A/D conversion performed by the ADC unit 27 are retained pixel by pixel by a parallel-serial converter (P/S) 28. The P/S 28 sequentially outputs the retained signals to a corrector (Ofs_Cal) 29. The corrector 29 corrects an offset level of each of the signals (electrical signals) output from the P/S 28 using a value (e.g., an output level of light-shielded pixels) that is common within one of pixel groups. Detailed operations of the corrector 29 will be described later. An LVDS (Low-Voltage Differential Signaling) 30 converts the signals output from the corrector 29 into serial low-voltage differential signals and outputs the serial low-voltage differential signals downstream. A controller (TG (timing generator)) 31 controls various units included in the photoelectric transducer 10 to cause the units to synchronize with a spread-spectrum clock (SSC) as will be described later with reference to FIG. 12.

Upstream from the P/S 28, the photoelectric transducer 10 processes parallel data obtained by performing parallel processing on pixels in the main-scanning direction. Hence, the AMEM unit 26 and the ADC unit 27 make up a parallel processor that performs, on a per-pixel-group basis, parallel processing in synchronization with the spread-spectrum clock output from the controller 31 on a plurality of electrical signals respectively obtained through conversion by the pixels. On the other hand, downstream from the P/S 28, the photoelectric transducer 10 processes serial data color by color (RGB).

As described above, in the photoelectric transducer 10, the parallel processor performs, on a per-pixel-group basis, parallel processing on electrical signals output from the pixels irrespective of the value of frequency of the SSC. Hence, in the photoelectric transducer 10, influence of the SSC takes the form of an offset deviation that is uniform, in each of the pixel groups, across all pixels of the pixel group. Accordingly, by subtracting the offset amount using the corrector 29, for example, the photoelectric transducer 10 can eliminate the need for downstream pixel-by-pixel correction. As a result, because the need for a memory for averaging and retaining pixel-by-pixel data is eliminated, the problem of an increase in circuit size, which would otherwise occur, is resolved.

Figure 6:
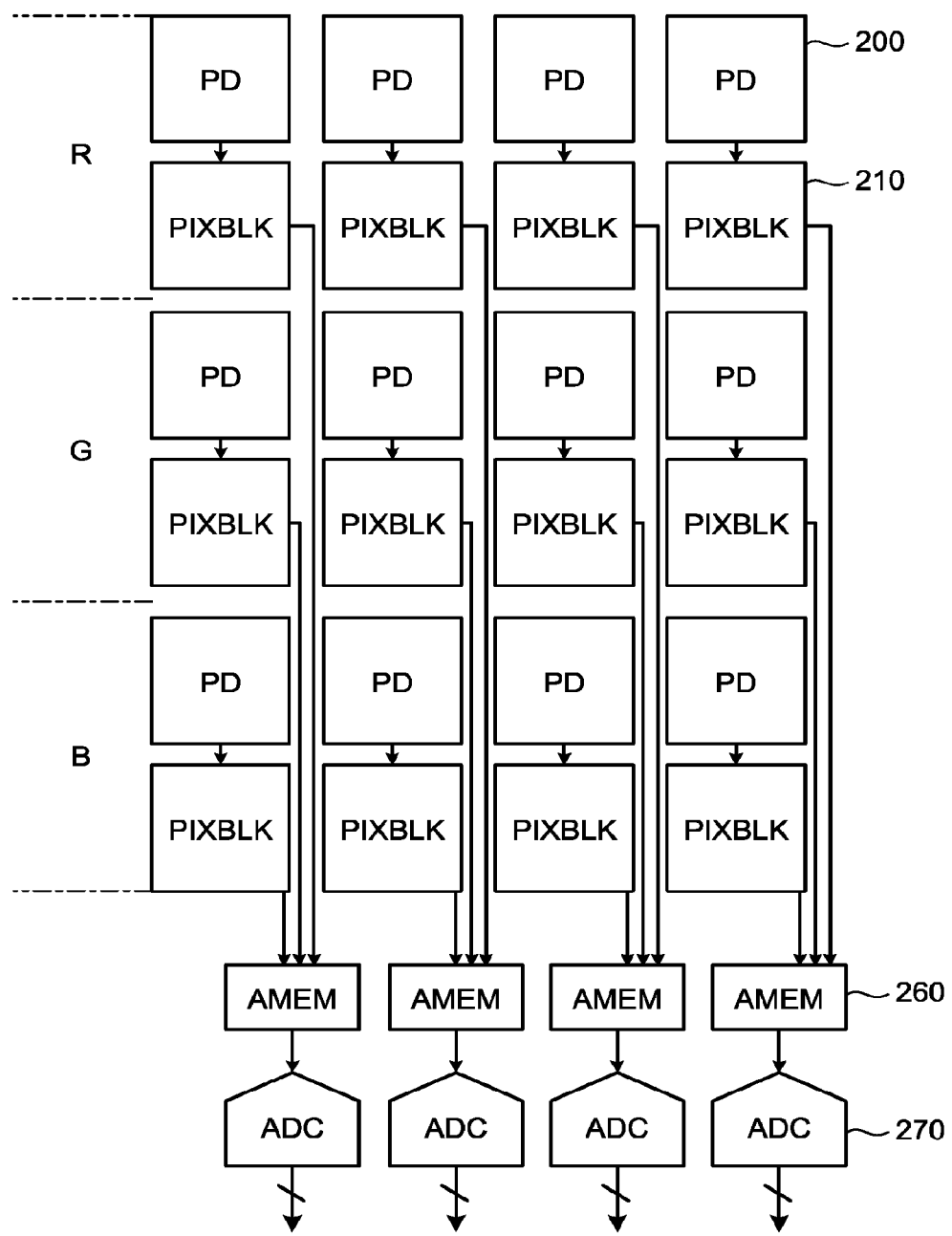
FIG. 6 is a diagram illustrating details and surroundings of a parallel processor in a photoelectric transducer.
Figure 7:
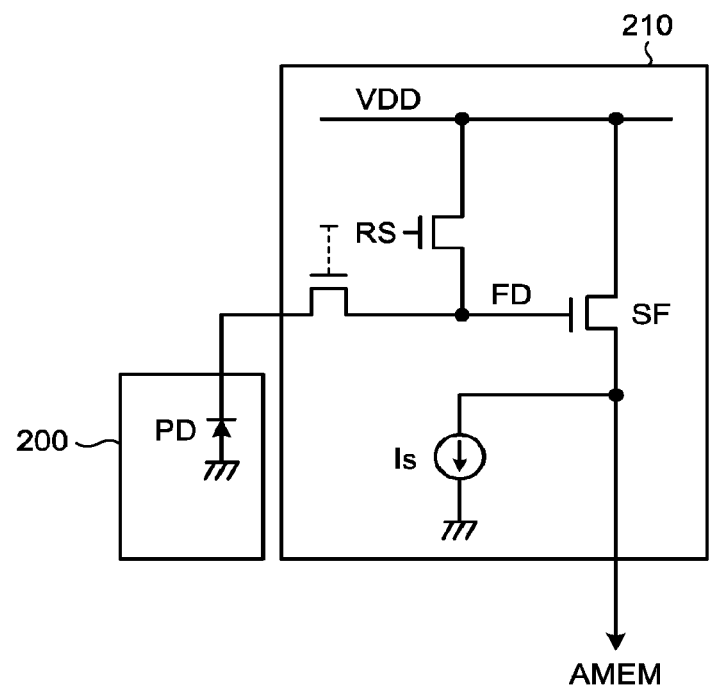
FIG. 7 is a diagram illustrating details of a PD and a pixel circuit.
Figure 8:
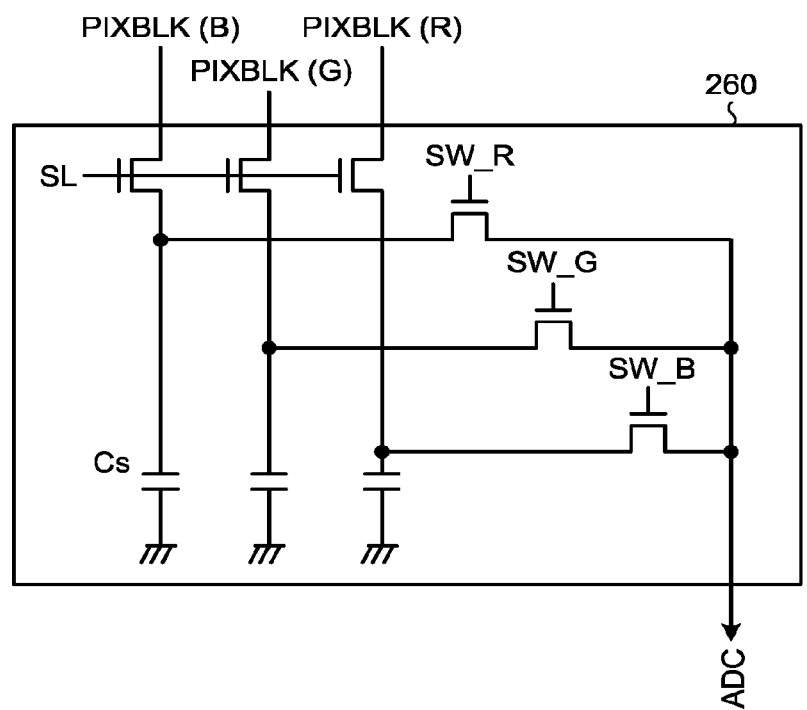
FIG. 8 is a diagram illustrating details of an AMEM.

A configuration for performing parallel processing in the photoelectric transducer 10 is described in detail below with reference to FIG. 6 to FIG. 8. FIG. 6 is a diagram illustrating details and surroundings of the parallel processor (the AMEM unit 26 and the ADC unit 27) in the photoelectric transducer 10. For example, each of the PIX(R) 20, the PIX(G) 22, and the PIX(B) 24 includes approximately 7,000 PDs (photodiodes) (light-receiving elements) 200. Each of the PIX_BLK(R) 21, the PIX_BLK(G) 23, and the PIX_BLK(B) 25 includes approximately 7,000 pixel circuits (PIXBLKs) 210. The AMEM unit 26 includes approximately 7,000 AMEMs 260. The ADC unit 27 includes approximately 7,000 ADCs 270. FIG. 7 is a diagram illustrating details of the PD 200 and the pixel circuit 210. FIG. 8 is a diagram illustrating details of the AMEM 260.

In the photoelectric transducer 10, each of the ADCs 270 is shared for R, G, and B (column ADC architecture) and conversion into digital data is performed sequentially for R, G, and B pixels, and thereby color-by-color parallel operation is achieved. At this time, all electrical signals output from pixels of a same color are A/D-converted simultaneously for each of the colors (RGB). The A/D-converted electrical signals of the R-G-B pixels are output serially. In this example, it is assumed that three pixel groups, i.e., a pixel group of every R pixel (including light-shielded pixels), a pixel group of every G pixel (including light-shielded pixels), and a pixel group of every B pixel (including light-shielded pixels), are defined in advance.

As illustrated in FIG. 7, the PD 200 outputs an accumulated charge to the pixel circuit 210. The pixel circuit 210 includes the floating diffusion (FD) that performs charge-voltage conversion, the reset transistor (RS) that resets the FD, the transfer transistor (T) that transfers the charge from the PD to the FD, the source follower (SF) that buffers a signal and outputs the signal downstream, and a bias current source (Is) for the SF.

As illustrated in FIG. 8, the AMEM 260 includes selection switches (SL) for making selection from signals of the respective colors, the capacitors (Cs: the analog memories) for retaining signals of the respective colors, and selection switches (SW_*) for reading out a signal from each Cs to the ADC 270. Operations from outputting, by the PDs 200, charges to retaining, by the AMEM 260, electrical signals are performed simultaneously among R, G, and B. However, the operation of reading out, by the ADC 270, the electrical signals retained in the AMEM 260 is performed one pixel by one pixel.

In the photoelectric transducer 10, the ADC 270 is shared by three pixels of one R pixel, one G pixel, and one B pixel. Alternatively, the photoelectric transducer 10 may be configured such that the ADC 270 is shared by six pixels of two R pixels, two G pixels, and two B pixels. When the pixel groups are configured on a per-color basis (for each of R, G, and B), the photoelectric transducer 10 performs parallel operation on a per-pixel-row basis, in which each pixel row lies in the sub-scanning direction, but performs time-series processing in the sub-scanning direction. In this case, because the same operation is performed in pixel positions, the configuration of the photoelectric transducer 10 can be simplified by, for example, causing the parallel processor to be shared. When the ADC 270 is shared by six pixels of two R pixels, two G pixels, and two B pixels, the parallel processor can be shared in a two-pixels-per-color fashion.

Figure 9:
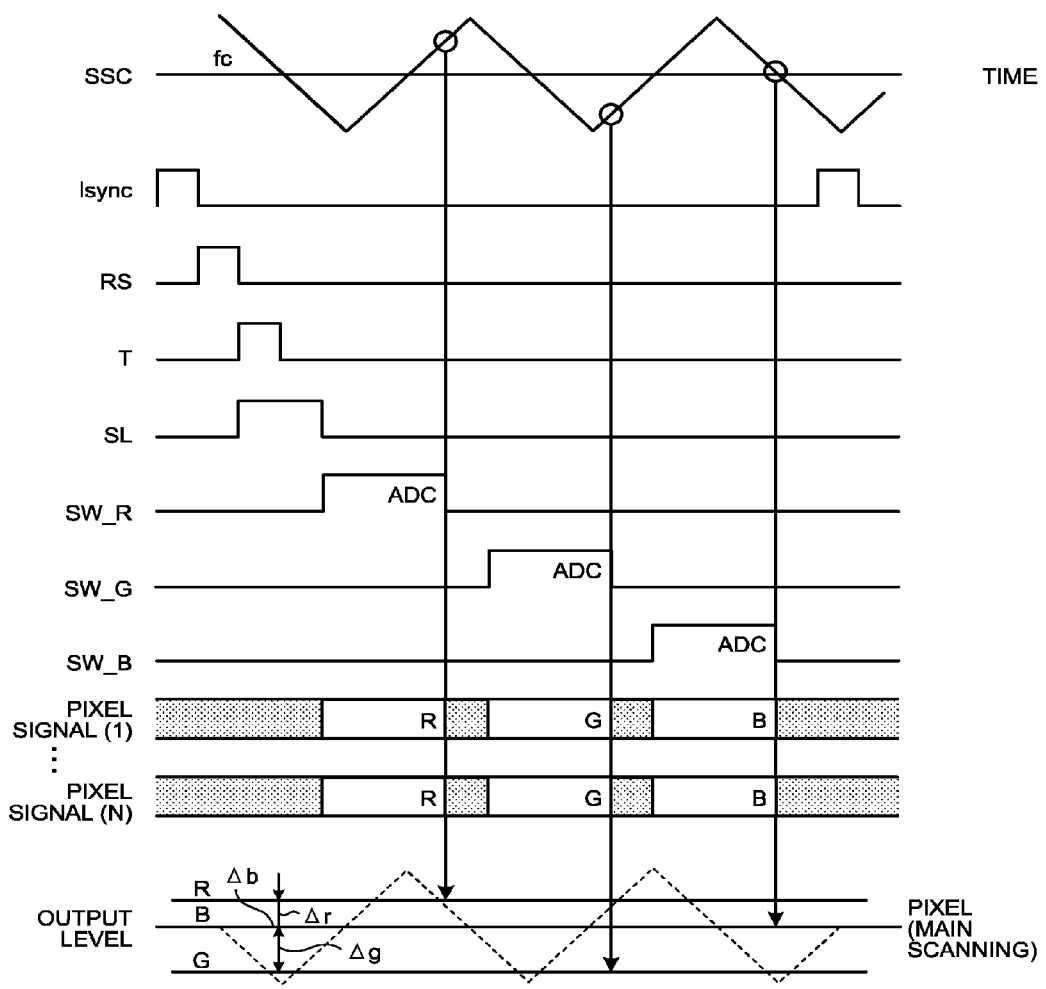
FIG. 9 is a diagram illustrating why an influence of the SSC in the photoelectric transducer takes the form of offset deviation that is uniform across all pixels in each of pixel groups.

FIG. 9 is a diagram illustrating why an influence of the SSC in the photoelectric transducer 10 takes the form of offset deviation that is uniform in each of the pixel groups (in this case, for each color) across all the pixels in the pixel group. When the above-described reset transistor (RS) is turned ON (goes High (H)), the floating diffusion (FD) is reset. Thereafter, when the transfer transistor (T) is turned ON (H), a charge accumulated in the PD is transferred to the FD. The selection switch (SL) is held ON (H) over this period, and thereby an output signal of the FD is retained in the memory capacitor Cs. Operations to be performed up to this point are common among all the pixels.

R, G, and B signals retained in the memory capacitors Cs are sequentially read out into the ADC 270. First, the selection switch SW_R is turned ON (R) to read out the R signal from the memory capacitor Cs. At this time, the ADC 270 is operating concurrently to perform A/D conversion on the R signal and output the thus-obtained digital data downstream during when the selection switch SW_R is held ON.

At this time, all the R pixels are performing the same operation or, put another way, operating in parallel. The same holds true with G and B; during when a corresponding one of the selection switch SW_G and the selection switch SW_B is ON, A/D conversion is performed, and all the G pixels or all the B pixels operate in parallel.

During the above-described series of operations, the frequency of the SSC varies with time as illustrated in FIG. 9. For example, when A/D conversion (i.e., digital data determination) is affected by frequency variation of the SSC, A/D conversion is performed near the frequency peak for R, near the frequency bottom for G, and near the frequency center for B. In this case, if an output level of an image varies with the varying frequency, an output level of R increases ($\Delta r$), an output level of G decreases ($\Delta g$), and an output level of B remains substantially the same ($\Delta b \sim 0$). The output level varies in this way is the same as illustrated in FIG. 2.

However, because the photoelectric transducer 10 performs the parallel operation of performing A/D-conversion on all the pixels of a same color simultaneously, variation in the output level is uniform across all the pixels of the same color. Because all pixels of a same color exhibit same variation for each of the colors (RGB), influence of the SSC takes the form of an output offset of each of the colors. Therefore, the influence of the SSC can be corrected only by subtracting the offset ($\Delta r/\Delta g/\Delta b$) downstream.

As described above, by virtue of performing parallel processing on a per-pixel-group basis, the photoelectric transducer 10 can correct the influence of the SSC only by subtracting the offset. This can be considered that the configuration that performs parallel processing on a per-desired-pixel-group basis limits the influence of frequency variation of the SSC to the per-pixel-group offsets. As a result, the need for a memory for averaging and retaining data to perform pixel-by-pixel shading correction is eliminated, and image stripes caused by the SSC can be reduced without increasing a circuit size and cost.

The influence of the SSC has been described through the example where the SSC is used in the control signals of processing involving from the PDs 200 to the ADCs 270. However, the above-described configuration is effective even when the SSC is not used in processing involving from the PDs 200 to the ADCs 270 but used in the LVDS or other logic circuit, for example. The reason lies in the configuration of the photoelectric transducer 10 where various circuits are integrated onto one chip and noise of the SSC can be superimposed, via a power supply or a GND (ground), even where the SSC is not directly used. In short, the reason is that the photoelectric transducer 10 has the configuration that is directly or indirectly susceptible to the influence of the SSC.

In contrast to the photoelectric transducer 10 according to the embodiment, a CCD linear sensor cannot perform parallel processing on thousands of pixels because CCD linear sensors are configured to perform charge transfer. Whereas CMOS area sensors can perform parallel processing, if an offset subtractor is provided for each of pixel groups that are to be parallel-processed, offset subtractors for the thousands of pixels are required and circuit size is not greatly different from when a shading correction memory is provided. Hence, the advantage of the photoelectric transducer 10 according to the embodiment can be considered as an advantage specific to CMOS linear sensors.

Figure 10A:
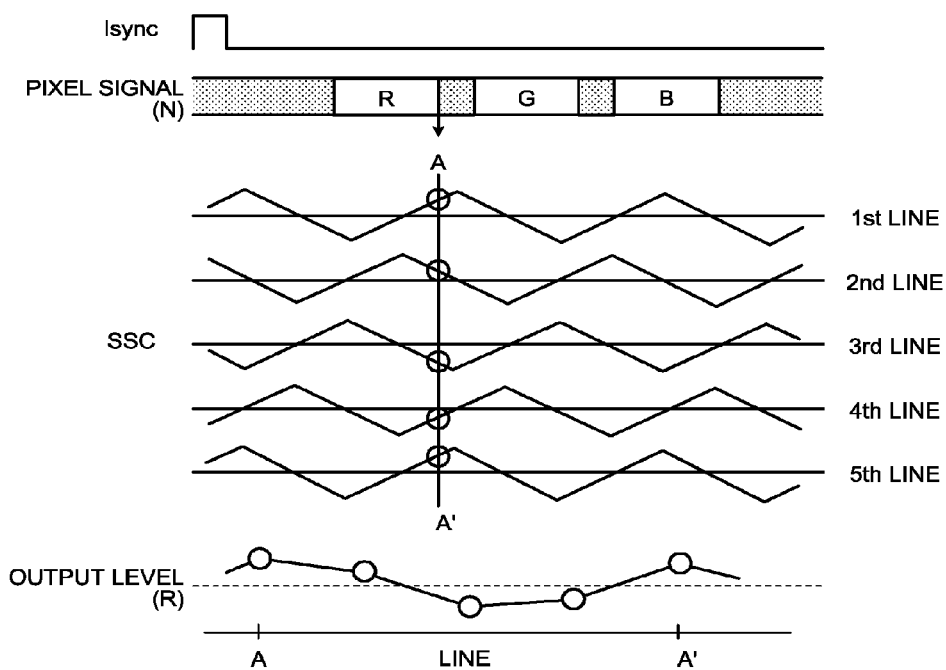
FIG. 10A and FIG. 10B are diagrams illustrating a method of reducing horizontal stripes by phase alignment between an SSC modulation period and a line period.
Figure 10B:
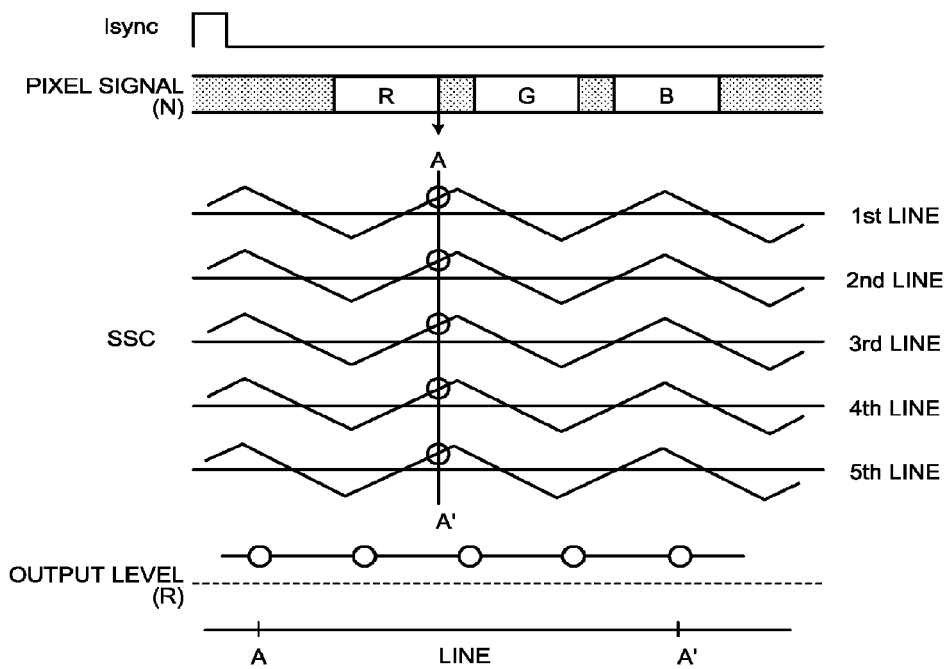

FIG. 10A and FIG. 10B are diagrams illustrating a method of reducing horizontal stripes by phase alignment between an SSC modulation period and a line period. It has been described above with reference to FIG. 9 that, by performing parallel processing on a per-pixel-group basis where each pixel group includes predetermined pixels (e.g., all pixels of a same color, for each of the colors), the influence of the SSC can be limited to per-pixel-group offsets. However, when the modulation period of the SSC and the line period are asynchronous, the per-pixel-group offset will vary from one line to another as in the comparative example illustrated in FIG. 10A. When the per-pixel-group offset varies from one line to another, because the level will vary from one line to another, horizontal stripes will remain on an image.

The photoelectric transducer 10 according to the embodiment can, even when offset correction is insufficient, reduce horizontal stripes as in the example illustrated in FIG. 4 by preventing the modulation period of the SSC and the line period from having phase relationship that varies from one line to another (FIG. 10B).

In the comparative example illustrated in FIG. 10A, the SSC modulation period and the line period are asynchronous. Put another way, the phase of the SSC modulation varies from one line to another. In this state, the frequency of the SSC at a point in time when, for example, R is processed, varies from one line to another (indicated by circles in FIG. 10A). Therefore, the offset level that depends on the frequency of the SSC varies from one line to another. Furthermore, the relationship between the SSC and the line period returns to the previous state when a predetermined number of lines have been processed. The comparative example illustrated in FIG. 10A illustrates a situation where the relationship returns to the previous state after five lines have been processed, which causes periodic horizontal stripes appearing on a read image.

By contrast, as illustrated in FIG. 10B, in the photoelectric transducer 10 according to the embodiment, the controller 31 brings the SSC modulation period and the line period into synchronization. Put another way, the SSC modulation are phase-aligned among all the lines. Accordingly, the frequency of the SSC at a point in time when R is processed is uniform among the lines and the offset level is constant in each of the lines.

The influence of the SSC illustrated in FIG. 10B appears as deviation of density in an entire image. It is known that pattern recognition capability of human eyes varies depending on frequency and density of a pattern. Generally, periodic or sharp changes, such as horizontal stripes and vertical stripes, are more easily recognized than change in density in the entire image is. Accordingly, influence on an image by change in density in the entire image has a smaller influence on an image than horizontal stripes and degrades appearance of the image less than the horizontal stripes. Hence, the photoelectric transducer 10 can be considered as converting variation in an image, such as horizontal stripes, that is periodic and has a high spatial frequency into variation in the image of low spatial frequency (spatial frequency is substantially zero in change in density in the entire image).

FIG. 10B illustrates an example where parallel processing is performed color by color (RGB). In particular, when the SSC is phase-aligned among all the pixels of a same color in this manner, because the deviation can be limited to the deviation in density in entire image, image degradation can be reduced. Even with a configuration that performs parallel processing in a two-pixels-per-color fashion, if frequencies of the SSC at points in time when two pixels of a same color are processed are close to each other, because sharpness (spatial frequency) of variation in an image of horizontal stripes can be converted into low spatial frequency, image degradation can be reduced in a similar manner.

Figure 11:
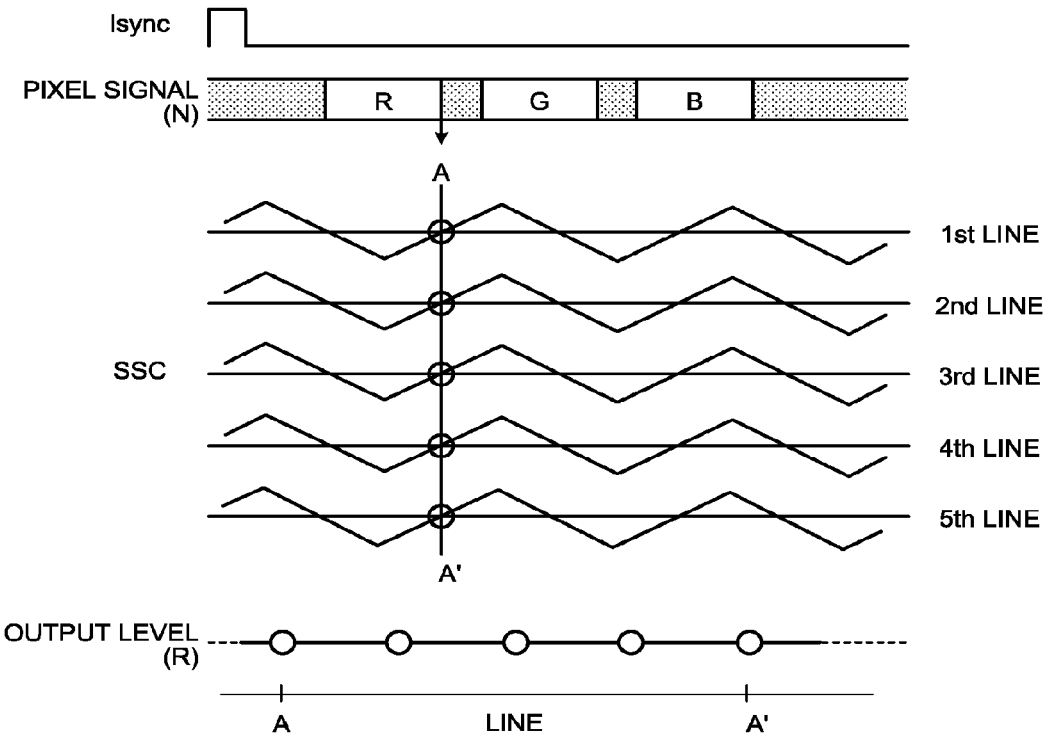
FIG. 11 is a diagram illustrating a method of adjusting timing of performing processing to when SSC modulation is zero to reduce the influence.

FIG. 11 is a diagram illustrating a method of adjusting timing of performing processing to when the SSC modulation is zero (the approximate center frequency fc) to reduce the influence. The example illustrated in FIG. 11 is similar to FIG. 10B in that the SSC modulation period is phase-aligned among all the lines. However, the example illustrated in FIG. 11 differs from FIG. 10B in that R is processed at points in time of zero modulation. Specifically, R is processed at each instant when the SSC is at the center frequency and no modulation is applied. Therefore, because the influence on the output level of R is equivalent to when no modulation is applied, the influence of the SSC modulation can be entirely reduced. While FIG. 11 illustrates an example where the point in time when R is processed is adjusted to the point of zero modulation, the influence of the SSC can be eliminated for all the colors if the similar adjustment is performed for the other colors (G/B).

Figure 12:
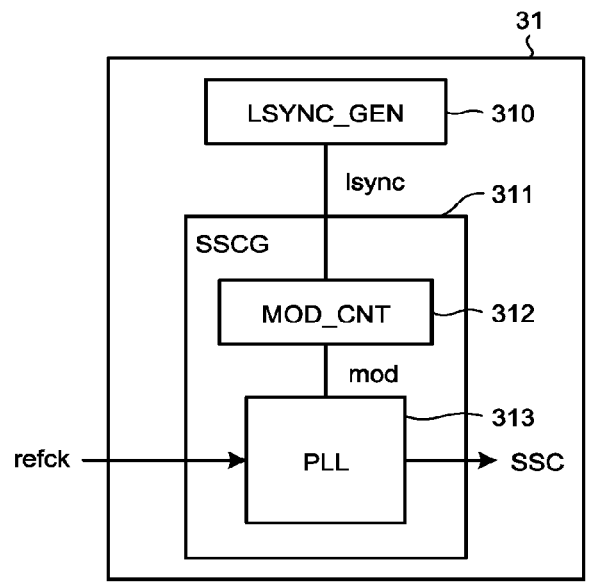
FIG. 12 is a diagram illustrating an example configuration of a controller.

The controller 31 that implements the above-described method for eliminating the influence of the SSC is described in more detail below. FIG. 12 is a diagram illustrating an example configuration of the controller 31. The controller 31 includes a line-period generator (LSYNC_GEN) 310 and an SSCG 311 and is configured to be capable of modulation resetting. The line-period generator 310 generates the main-scanning synchronization signal (lsync).

The SSCG 311 includes a PLL (Phase Locked Loop) 313 and is configured to apply a modulation signal (mod) output from a modulation controller (MOD_CNT) 312 to input of an internal VCO (Variable-Controlled-Oscillator) that generates a clock of a desired frequency. The modulation controller 312, which applies the modulation waveform mod to the PLL 313, outputs a modulation waveform that resets to zero modulation to the PLL when the main-scanning synchronization signal (lsync) is input from the line-period generator (LSYNC_GEN).

Figure 13:
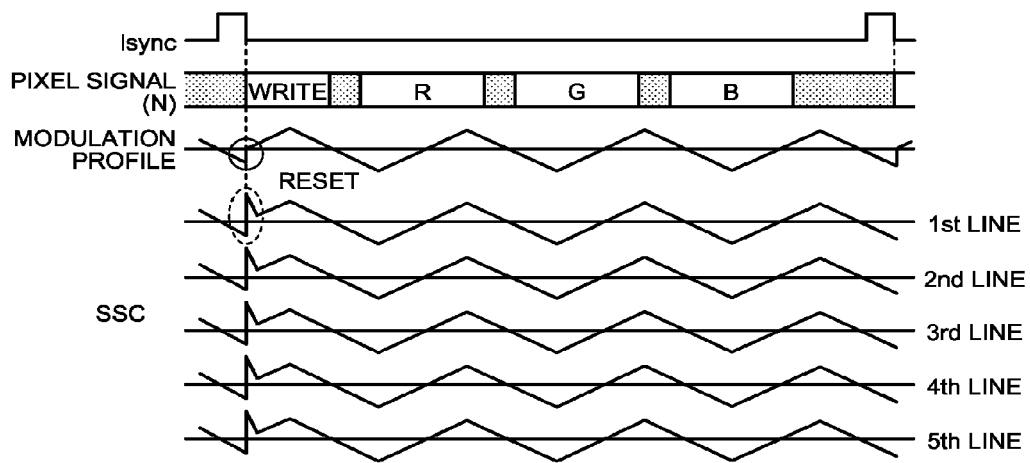
FIG. 13 is a diagram illustrating a state where modulation resetting has been performed by the controller.

FIG. 13 is a diagram illustrating a state where modulation resetting has been performed by the controller 31. A modulation waveform generated by the controller 31 is illustrated as a modulation profile in FIG. 13. Specifically, immediately after the main-scanning synchronization signal (lsync) is applied, the frequency is reset to zero modulation and thereafter exhibits such a triangular profile as described above. Modulated frequency profiles of the clock (SSC) are illustrated in a lower portion of FIG. 13. While the SSC varies basically in the same manner as the modulation profile, the SSC is forcibly reset to zero modulation only when the main-scanning synchronization signal (lsync) is applied.

By virtue of including the SSCG 311 that resets the SSC modulation for every line as described above, the photoelectric transducer 10 can bring the modulation period in synchronization with the line period irrespective of a method of generating the SSC, a method of setting the modulation period and the line period, and the like.

Figure 14:
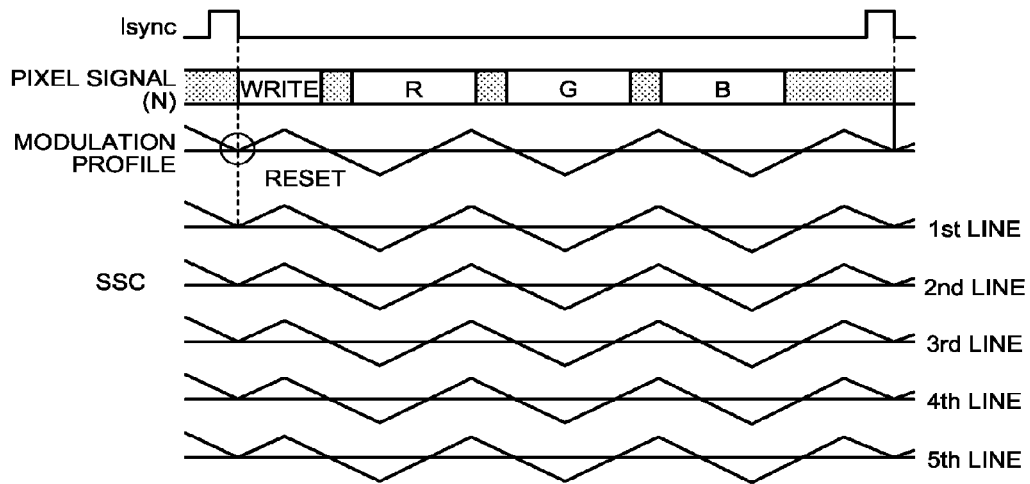
FIG. 14 is a diagram illustrating a method for reducing undesirable frequency fluctuation that can occur when the SSCG performs modulation resetting.

FIG. 14 is a diagram illustrating a method for reducing undesirable frequency fluctuation that can occur when the SSCG 311 performs modulation resetting. When the difference between a frequency immediately before modulation resetting and a frequency when the modulation resetting is performed is large, the frequency can fluctuate. The photoelectric transducer 10 may preferably configure a relationship between the modulation period and the line period so as to make the frequency immediately before modulation resetting and the frequency when the modulation resetting is performed substantially equal to each other.

In FIG. 14, settings are configured so as to make the frequency immediately before modulation resetting and the frequency when the modulation resetting is performed substantially equal to each other. Specifically, the line period is set to be approximately 3.5 times as long as the modulation period. With the settings, when the SSC is reset to zero modulation upon application of modulation resetting, a modulation profile exhibits substantially zero modulation at a point in time immediately before the modulation resetting. Hence, because the frequency immediately before modulation resetting and the frequency immediately after the modulation resetting are substantially equal to each other, undesirable frequency fluctuation caused by the resetting can be reduced.

While FIG. 14 illustrates an example where the line period is set to be approximately 3.5 times as long as the modulation period, alternatively, the line period may be set to an integer multiple of the modulation period. Put another way, the line period may be set as desired so long as frequency is substantially zero-modulated after lapse of one line period from when the SSC is reset to zero modulation.

The inventor found that, in a frequency band of a general SSCG, if a difference from a zero-modulation state is approximately within 20%, the difference does not affect operations. For this reason, it is unnecessary to strictly adjust the relationship between the line period and the modulation period. No problem will arise so long as error of the relationship falls within a range of approximately ±20% presented below (N is an integer):

for a line period that is approximately N times as long as the modulation period: from N−0.2 to N+0.2 (times); and for a line period that is approximately N+0.5 times as long as the modulation period: from N+0.3 to N+0.7 (times).

Specifically, the controller 31 performs control such that the period, in which light is converted into electrical signals in pixels, is advanced or delayed by no more than 20% relative to the modulation period or one-half of the modulation period. Furthermore, even when the relationship between the line period and the modulation period has a difference larger than the above-described value, i.e., ±20%, the influence of the SSC can be reduced using, in a combined manner, another configuration for reducing undesirable modulation fluctuation caused by resetting and the like.

Figure 15:
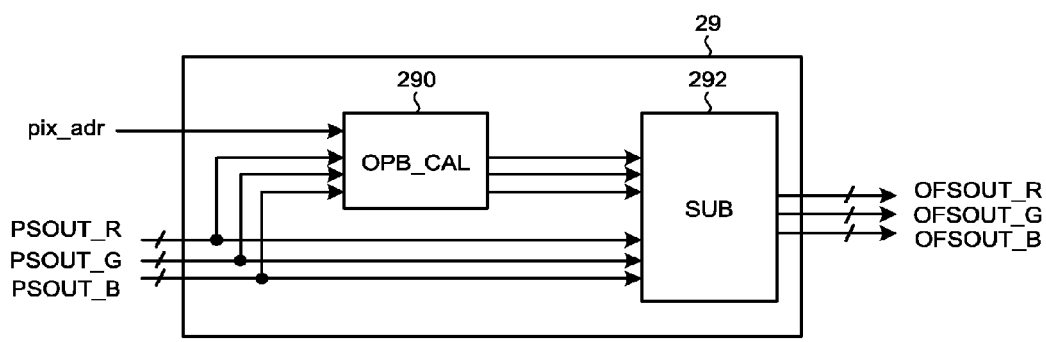
FIG. 15 is a diagram illustrating a configuration of a corrector that corrects offsets using light-shielded pixels.

The corrector 29 that corrects an output offset, which represents the influence of the SSC, of each of the colors is described in detail below. FIG. 15 is a diagram illustrating a configuration of the corrector 29 that corrects the offsets using the light-shielded pixels. The corrector 29 corrects offset levels on a per-pixel-group basis using the plurality of light-shielded pixels (OPBs) included in the light-shielding pixel areas 40 illustrated in FIG. 5.

The pixel groups are divided color by color (RGB), for example. R effective pixels and R OPBs are processed simultaneously. Specifically, because the SSC exerts the same influence on these two pixels, the photoelectric transducer 10 can correct an offset, which is the influence of the SSC, by calculating a difference between an output of the effective pixel and an output of the OPB.

As illustrated in FIG. 15, data about R, G, and B pixels output from the P/S 28 is input to the corrector (Ofs_Cal) 29 as pixel-by-pixel serial data on a per-color (RGB) basis. When the input pixel data is from the OPB, the pixel data is input to an OPB calculator (OPB_CAL) 290, where an average of data of a plurality of main-scanning pixels is calculated and retained as offset data (OFSDAT_*). The thus-generated offset data OFSDAT_* is subtracted from pixel data (PSOUT_*) by a subtractor (SUB) 292 to be output as offset-corrected data (OFSOUT_*).

By contrast to an area sensor, a CMOS linear sensor generally reads out all pixels independently of each other. Accordingly, because data readout from R OPB pixels is performed consistently from same pixels, accuracy of offset correction can be increased by temporal averaging (in the case of a linear sensor, averaging in the sub-scanning direction). However, if simple averaging in the sub-scanning direction is employed, real-time responsivity of correction can be lost, which can lead to a failure of performing the correction function. Therefore, weighted averaging, such as weight-added averaging, may preferably be employed.

A method for the photoelectric transducer 10 for correcting the offsets using outputs of the light-shielded pixels arranged at a plurality of different positions is described below. The photoelectric transducer 10 has a chip layer similar to the layout of the components illustrated in FIG. 5 that illustrates the components of the photoelectric transducer 10. Specifically, in the photoelectric transducer 10, components from the PIX(R) 20 to the ADC unit 27 dominate substantially an entire center portion of the chip. Each of the controller 31, which feeds control signals to these components, and the LVDS 30, which is a data output unit, is positioned on a right portion or a left portion of the chip. What matters is on which one of the right portion and the left portion of the chip the controller 31 is arranged.

It is conceivable that the influence of the SSC in the photoelectric transducer 10 can be superimposed on a component via a power supply or a GND (ground) even if the SSC is not directly used by the component. This is because the photoelectric transducer 10 is an analog/digital mixed circuit that can incorporate logic.

In particular, the controller 31 that generates control signals for various units is a main noise source of the SSC. This noise source is located on either the right portion or the left portion of the chip, which suggests that the magnitude of the influence of the SSC can vary depending on, for example, pixel position. Therefore, in a linear sensor where the distance between a noise source and a position in the main-scanning direction has a linear relationship and the distance depends on a pixel position, the magnitude of the influence of the SSC linearly changes with the pixel position in the main-scanning direction as illustrated in FIG. 16.

Accordingly, an offset amount of an effective pixel at a desired position can be calculated easily by arranging the light-shielding pixel area 40 on each of a leading end and a trailing end in the main-scanning direction of each of the PIX(R) 20, the PIX(G) 22, and the PIX(B) 24 as illustrated in FIG. 5 and performing linear interpolation using pixel data (offset amounts) of the OPBs in each of the light-shielding pixel areas 40 and a pixel address. Accordingly, it is possible to apply offset correction even when the magnitude of the influence of the SSC varies from one pixel position to another in the main-scanning direction in the photoelectric transducer 10.

Figure 16:
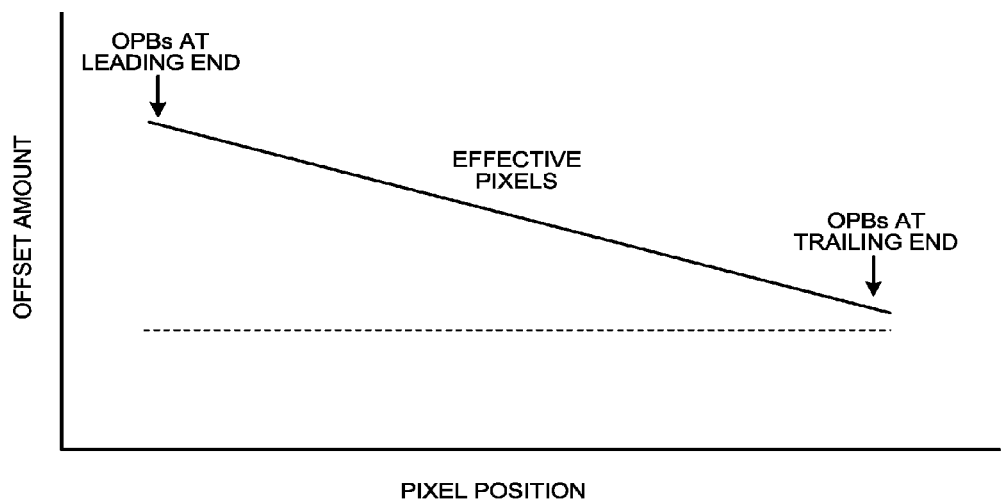
FIG. 16 is a graph illustrating offset amount versus pixel position.

FIG. 16 illustrates an example where, as illustrated in FIG. 5, the controller 31 is positioned on the leading-end side (the left side in FIG. 16) in the main-scanning direction. FIG. 16 indicates that the closer to the controller 31, the greater the magnitude of the influence of the SSC (i.e., offset deviation), and vice versa. Linear interpolation may preferably be performed by the OPB calculator 290 illustrated in FIG. 15 using pixel data about the OPBs on the leading end and the trailing end in the main-scanning direction and an address (pix_adr) of a pixel to be corrected.

Figure 17:
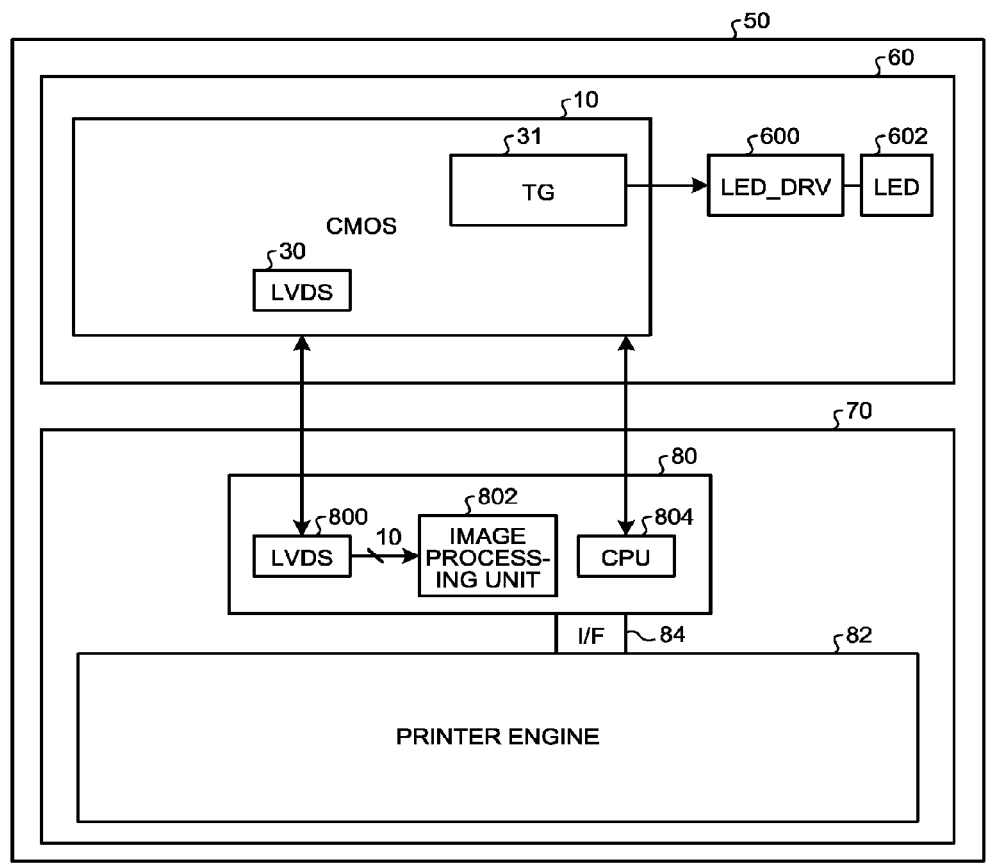
FIG. 17 is a diagram illustrating an overview of an image forming apparatus including an image reading device including the photoelectric transducer, for example.

An image forming apparatus including an image reading device including the photoelectric transducer 10 according to the embodiment is described below. FIG. 17 is a diagram illustrating an overview of an image forming apparatus 50 including an image reading device 60 including the photoelectric transducer 10, for example. The image forming apparatus 50 is, for example, a copier or an MFP (Multi-function Peripheral) including the image reading device 60 and an image forming unit 70.

The image reading device 60 includes the photoelectric transducer 10, an LED (Light-Emitting Diode) driver (LED_DRV) 600, and an LED 602, for example. The LED driver 600 drives the LED 602 in synchronization with the line synchronization signal output from the controller (TG) 31 or the like. The LED 602 irradiates an original document with light. In the photoelectric transducer 10, in synchronization with the line synchronization signal or the like, the plurality of PDs receive light reflected off the original document and generate and start accumulating charges. In the photoelectric transducer 10, after performing processing including A/D conversion, parallel-serial conversion, and the correction, the LVDS 30 outputs the thus-processed image data to the image forming unit 70.

The image forming unit 70 includes a processing unit 80 and a printer engine 82. The processing unit 80 and the printer engine 82 are connected to each other via an interface (I/F) 84.

The processing unit 80 includes an LVDS 800, an image processing unit 802, and a CPU (Central Processing Unit) 804. The CPU 804 controls various units, including the photoelectric transducer 10, included in the image forming apparatus 50. The CPU 804 (or the controller 31) performs control so that the PDs start generating charges, which depend on the amount of received light, substantially simultaneously.

The photoelectric transducer 10 outputs, for example, image data representing an image read by the image reading device 60, the line synchronization signal, a transfer clock signal, and the like to the LVDS 800. The LVDS 800 converts the received image data, the line synchronization signal, the transfer clock signal, and the like into 10-bit parallel data. The image processing unit 802 performs image processing on the converted 10-bit data and outputs the thus-processed image data and the like to the printer engine 82. The printer engine 82 performs printing using the received image data.

According to an embodiment, occurrence of stripes on a read image can be reduced while reducing an increase in circuit size.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A photoelectric transducer comprising:
    a plurality of pixels arranged in one direction for each of colors of light to be received, and configured such that light is converted into an electrical signal in each of the plurality of pixels;
    a parallel processor configured to simultaneously perform parallel processing including analog to digital conversion on a plurality of electrical signals obtained through conversion in the pixels in synchronization with a spread-spectrum clock for each of pixel groups, each of the pixel groups including a predetermined number of pixels; and
    a corrector configured to correct an offset level of each of the plurality of electrical signals having undergone the parallel processing performed by the parallel processor, using one of values, each of the values being common within one of the pixel groups.

2. The photoelectric transducer according to claim 1, wherein each of the pixel groups includes a plurality of pixels configured to receive light of a same color.

3. The photoelectric transducer according to claim 1, further comprising
    a controller configured to control timing of the parallel processor performing parallel processing in synchronization with the spread-spectrum clock, wherein
    the controller is configured to align a phase of a modulation period of the spread-spectrum clock for every period in which light is converted into electrical signals in the pixels.

4. The photoelectric transducer according to claim 3, wherein the controller is configured to perform control to reset the phase of the spread-spectrum clock each time light is converted into electrical signals in the pixels.

5. The photoelectric transducer according to claim 4, wherein the controller is configured to perform control to cause the period in which light is converted into electrical signals in the pixels, to be advanced or delayed by no more than twenty percent relative to any one of the modulation period and one-half of the modulation period.

6. The photoelectric transducer according to claim 1, wherein each of the pixel groups is for one of the colors of light to be received in the pixels.

7. The photoelectric transducer according to claim 1, wherein the parallel processor is configured to perform parallel processing on the plurality of electrical signals for each of the pixel groups at a point in time when a frequency of the spread-spectrum clock is equal to an approximate center frequency.

8. The photoelectric transducer according to claim 1, wherein the corrector is configured to correct the offset level using an output level of a light-shielded pixel provided for each of the pixel groups.

9. The photoelectric transducer according to claim 8, wherein the light-shielded pixel includes light-shielded pixels arranged at a plurality of different positions for each of the pixel groups.

10. The photoelectric transducer according to claim 8, wherein the corrector is configured to correct the offset level using an average value of output levels of the light-shielded pixel, the output levels being obtained during when light is converted in an electrical-signal in each of the pixels a plurality of times.

11. An image reading device comprising the photoelectric transducer according to claim 1.

12. An image forming apparatus comprising:
    the image reading device according to claim 11; and
    an image forming unit configured to form an image based on an output of the image reading device.

13. An image reading method comprising:
    simultaneously performing parallel processing including analog to digital conversion on a plurality of electrical signals in synchronization with a spread-spectrum clock, the electrical signals obtained through conversion in pixels, the pixels being arranged in one direction for each of colors of light to be received, and configured such that light is converted into an electrical signal in each of the plurality of pixels, each of pixel groups including a predetermined number of pixels; and
    correcting an offset level of each of the plurality of electrical signals having undergone the parallel processing, using one of values, each of the values being common within one of the pixel groups.

14. A photoelectric transducer comprising:
    a plurality of pixels arranged in one direction for each of colors of light to be received, and configured such that light is converted into an electrical signal in each of the plurality of pixels;
    a parallel processor configured to simultaneously perform parallel processing including analog to digital conversion on a plurality of electrical signals obtained through conversion in the pixels for each of pixel groups, each of the pixel groups including a predetermined number of pixels; and
    a corrector configured to correct an offset level of each of the plurality of electrical signals having undergone the parallel processing performed by the parallel processor, using one of values, each of the values being common within one of the pixel groups, wherein
    at least one processor of the photoelectric transducer other than the parallel processor operates in synchronization with a spread-spectrum clock.

* * * * *